(12) United States Patent
Martin et al.

(10) Patent No.: US 6,908,024 B2
(45) Date of Patent: Jun. 21, 2005

(54) SIMULTANEOUS MAGNETIC PULSE FRAMING

(75) Inventors: Samuel V. Martin, Perkasie, PA (US); Christopher A. Rager, Womelsdorf, PA (US); Scott M. McGill, Kenilworth, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/639,305

(22) Filed: Aug. 12, 2003

(65) Prior Publication Data

US 2005/0035178 A1 Feb. 17, 2005

(51) Int. Cl.⁷ .............................................. B23K 31/00
(52) U.S. Cl. ..................................................... 228/115
(58) Field of Search ................................ 228/115, 212; 219/600–607, 615–617

(56) References Cited

U.S. PATENT DOCUMENTS

| | | | |
|---|---|---|---|
| 4,484,756 A | | 11/1984 | Takamiya et al. |
| 5,222,024 A | * | 6/1993 | Orita et al. .................. 701/93 |
| 5,338,080 A | | 8/1994 | Janotik et al. |
| 5,616,261 A | * | 4/1997 | Forrest .................. 219/121.63 |
| 5,966,813 A | | 10/1999 | Durand |
| 5,981,921 A | * | 11/1999 | Yablochnikov ............. 219/603 |
| 6,100,497 A | * | 8/2000 | Maruyama et al. .... 219/121.63 |
| 6,104,012 A | | 8/2000 | Durand |
| 6,234,375 B1 | * | 5/2001 | Durand ........................ 228/115 |
| 6,255,631 B1 | | 7/2001 | Kichline, Jr. et al. |
| 6,348,670 B2 | * | 2/2002 | Kistersky et al. ....... 219/121.45 |
| 6,367,680 B1 | * | 4/2002 | Duggan ...................... 228/107 |
| 6,379,254 B1 | * | 4/2002 | Yablochnikov ............. 464/134 |
| 6,389,697 B1 | | 5/2002 | Benoit et al. |
| 6,400,538 B1 | * | 6/2002 | Kistersky et al. ............. 361/17 |
| 6,412,818 B1 | | 7/2002 | Marando |
| 6,523,876 B1 | | 2/2003 | Durand |
| 6,548,791 B2 | * | 4/2003 | Kistersky et al. ........... 219/617 |
| 6,548,792 B1 | * | 4/2003 | Durand ........................ 219/617 |
| 6,630,649 B1 | * | 10/2003 | Gafri et al. .................. 219/603 |
| 2004/0112942 A1 | * | 6/2004 | Durand ........................ 228/115 |

FOREIGN PATENT DOCUMENTS

FR          2450145       *  9/1980
JP        404063643 A     *  2/1992

* cited by examiner

Primary Examiner—Kiley S. Stoner
(74) Attorney, Agent, or Firm—MacMillan, Sobanski & Todd, LLC

(57) ABSTRACT

A method is performed for permanently attaching framing structural members to an underbody of an automotive vehicle. An underbody structural member including one or more cross members and a plurality of metallic structural members are provided at a workstation. The underbody structural member is aligned to the plurality of metallic structural members at the workstation. The assembled underbody structural member and the plurality of metallic structural members are permanently and simultaneously secured at the workstation using magnet pulse welding.

17 Claims, 4 Drawing Sheets

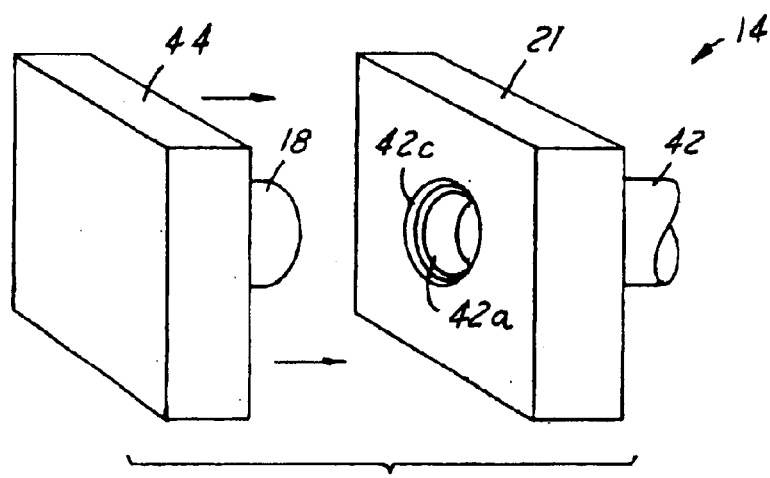
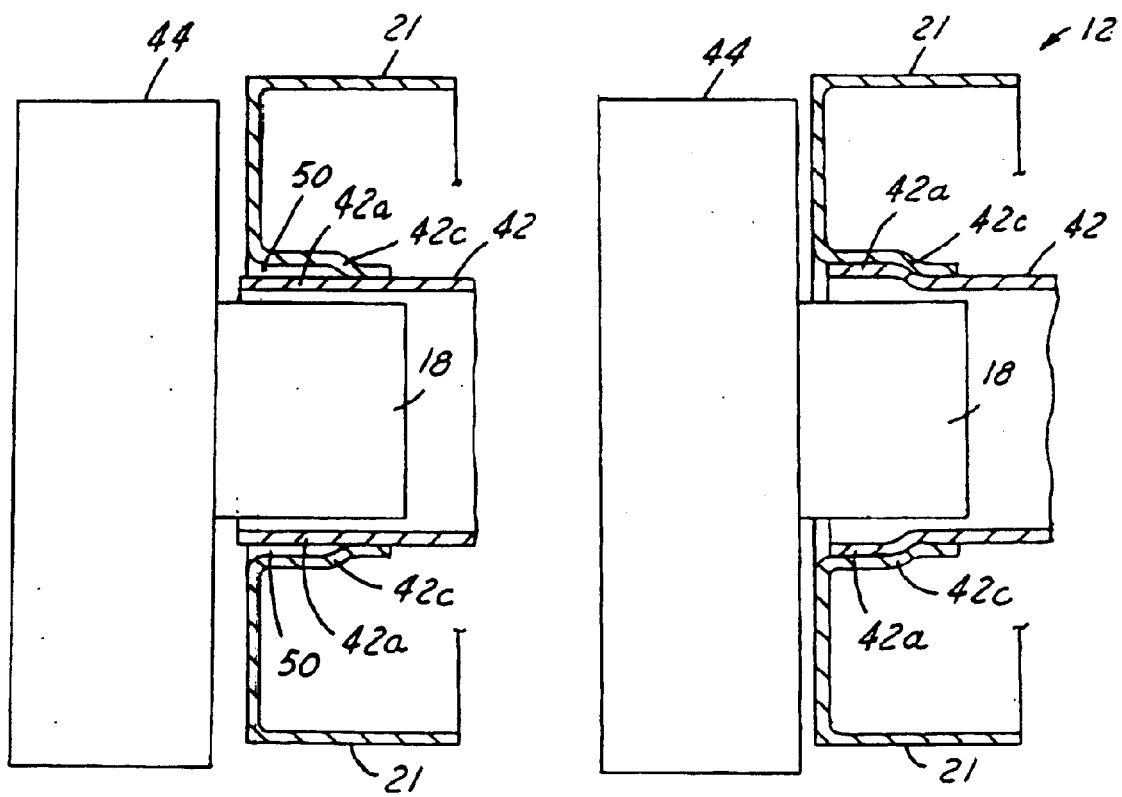

SIMULTANEOUS MAGNETIC PULSE FRAMING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to framing an automotive vehicle, and, more specifically, to a method of framing structural members to an underbody of an automotive vehicle.

2. Description of the Related Art

One typical type of vehicle frame assembly is made from a plurality of structural members. The structural members are held in juxtaposition by temporarily affixing or loosely clamping them together at a first framing workstation. The temporarily affixed or clamped structural members are then moved to a second workstation where the structural members are specifically positioned relative to one another by a variety of fixtures and the structural members are secured to one another by a plurality of spot welds. The spot welded structure is moved to a third framing station where the clamps are removed and another welding operation is performed to permanently secure all of the structural members together to form a single vehicle frame. Alternative framing operations include providing a first set of structural members (e.g., underbody) at a first workstation. A second set of structural members (e.g., body sides) are assembled to the underbody. The underbody and the second set of structural members are moved to a second workstation where a third set of structural members such a roof frames and roofing cross members are assembled. The assembled structural members is then moved to a fourth workstation where additional inner framing structures may be added for assembly. The assembled structural members are then moved to a fifth workstation where all framing joints are then permanently welded. These common types of framing and assembly operations utilize numerous manufacturing operations, added equipment at the various workstation locations, and added manufacturing space to perform the numerous framing and assembly operations.

Vehicle frames require high strength framing for various purposes which include stability, reliability, crashworthiness, low NVH, and riding comfort. Manufacturers of vehicles are constantly redesigning vehicle frames to reduce the overall weight of the vehicle for increasing fuel economy while maintaining the high strength features of the vehicle frame. Furthermore, it is desired that the cost of manufacturing the vehicle frames be kept low by manufacturing the framing assemblies with few operations and minimal specialized equipment.

Aluminum frame components have been used as substitutes for steel framing parts. Aluminum components in certain designs can lower the cost and weight of the vehicle frame while maintaining required features such as high strength and reliability. However, substitution of aluminum has not been completely successful. For example, aluminum has anodic properties which when combined with another metal or alloy having high cathodic properties may accelerate the corrosion of the aluminum. Combining aluminum with non-aluminum components close to its anodic index (such as steel) reduces the effects of galvanic corrosion and creates advantages such as higher strength, improved NVH, lower weight, and lower cost. However, manufacturing of such composites structures has resulted in numerous and complex manufacturing operations including multiple workstations and excessive measures to ensure sufficient assembly and joint strength between aluminum components and other components.

SUMMARY OF THE INVENTION

The present invention provides a method for permanently and simultaneously securing an underbody to a plurality metallic structural members of a vehicle framing assembly by a magnetic pulse welding process at a single workstation. The plurality of structural members may be formed from dissimilar metallic material. The invention results in the advantages of reduced overall vehicle structure weight and cost of the framing assembly while creating high strength joints between structural components of different metallic composition.

In one aspect of the invention, a method is performed for permanently attaching framing structural members to an underbody of an automotive vehicle. An underbody structural member including one or more cross members and a plurality of metallic structural members are provided at a workstation. The underbody structural member is aligned to the plurality of metallic structural members at the workstation. The assembled underbody structural member and the plurality of metallic structural members are permanently and simultaneously secured at the workstation using magnet pulse welding.

BRIEF DESCRIPTION OF THE DRAWINGS

FIG. 3 is a perspective view of a magnetic pulse welder aligned with a respective tubular cross member and body side joint.

FIG. 4a is an elevational view of a preferred embodiment of a joint illustrated in FIG. 3 between a respective tubular cross member and a side rail.

FIG. 4b is an elevational view of a preferred embodiment of a joint as illustrated in FIG. 4a formed between the respective tubular cross member and the side rail of the body side by magnetic pulse welding.

DETAILED DESCRIPTION OF PREFERRED EMBODIMENTS

Figure 1:
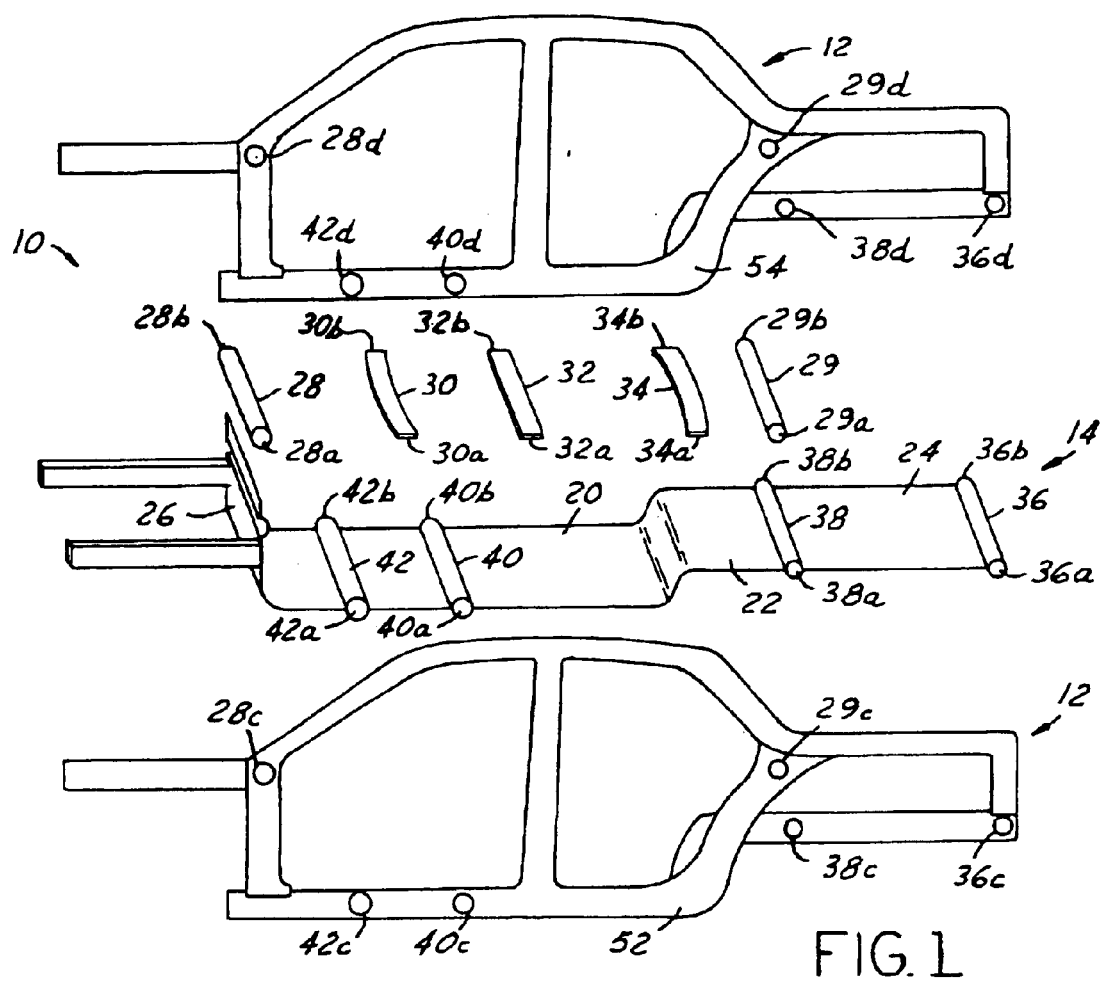
FIG. 1 is an exploded view of a vehicle framing assembly according to a preferred embodiment.

Referring now to the Drawings and particularly to FIG. 1, there is shown a plurality of individual automotive structural members of a vehicle frame assembly 10. The individual components comprise an underbody 14 including one or more cross members 36, 38, 40, and 42, and left and right body sides 12. The body sides 12 are preferably made of steel. The cross members 36, 38, 40, 42 may include at least one tubular cross member and are preferably made of aluminum.

The underbody 14 is a structure having a generally planar surface made of stamped aluminum. Alternatively, other metallic materials such as steel or magnesium may be used. The generally planar surface of the underbody 14 may include various planar surfaces including a main floor portion 20, a mid floor portion 22, a trunk floor portion 24, and a bulkhead portion 26. The underbody 14 includes underbody cross members 36, 38, 40, and 42 spaced apart from one another. Preferably, the underbody cross members 36, 38, 40, and 42 are integrally cast with and extend transverse to the trunk floor portion 24 and the main floor portion 20. Alternatively, the underbody cross members 36, 38, 40, 42 may be attached to the underbody 14 by methods such as welding or adhesives. In the preferred embodiment, the underbody cross members 36, 38, 40, and 42 are tubular and may comprise the shapes of, but are not limited to, circles, ovals, rectangles, squares, trapezoids, parallelograms, triangles, and polygons of greater than four sides. The underbody cross members 36 and 38 include ends 36a, 36b, 38a, and 38b extending though and beyond the planar surface of the trunk floor portion 24. Additionally, the underbody cross members 40 and 42 include ends 40a, 40b, 42a, and 42b extending through and beyond the planar surface of the main floor portion 20.

The body sides 12 are preferably a steel frame structure. The body sides 12 include a plurality of apertures, each receiving an end of a respective cross member. The plurality of apertures is formed through an inner and outer wall of a structural channel member 52 and 54 of the body sides 12. The respective aperture is substantially the same shape as the respective cross member to which it mounts. In one preferred embodiment, the respective aperture and cross member are circular in shape and the respective aperture has an inner diameter that is slightly larger than an outer diameter of the respective end so that the respective end may be inserted into the respective aperture. If another shape is utilized for the respective cross member and aperture, then the perimeter of the respective aperture will be slightly larger than the perimeter of the respective end so as to insert the respective end in the respective aperture. The body sides 12 include apertures 36c, 36d, 38c, and 38d and 40c, 40d, 42c, and 42d for respectively receiving ends 36a, 36b, 38a, and 38b of the trunk floor portion 24 and the ends 40a, 40b, 42a, and 42b of the main floor portion 20 so as to adjoin the body sides 12 to the underbody 14 after welding.

The vehicle frame assembly 10 may include a plurality of secondary cross members 11 interconnecting the body sides 12 (e.g. at the top ends). In the preferred embodiment, a secondary cross member 28 is located forward in the vehicle and a secondary cross member 29 is located rearward in the vehicle for adding torsional stability and strength to a middle portion of the vehicle frame assembly 10. The secondary cross members 28 and 29 can be tubular and made of steel or any other similar or dissimilar metallic metal.

In the preferred embodiment, the secondary cross members 28 and 29 have a first end 28a and 29a and a second end 28b and 29b that extend perpendicular to the body sides 12. The body sides 12 include apertures 28c, 28d, 29c, 29d for receiving the respective ends. The first and second ends 28a, 28b, 29a, 29b extend through the inner and outer wall of the apertures 28c, 28d, 29c, and 29d to adjoin the body sides 12 after magnetic pulse welding, although other suitable methods of attachment may be utilized. For example, magnetic pulse forming may be used to achieve an interference fit between the cross members and the body sides (which may also be supplemented by a secondary joining operation such as adhesive bonding or arc welding). Such an interference fit may include the use of a noncircular aperture to improve retention of the expanded portion of the tubular cross member.

Other secondary cross members 30, 32, and 34 may be generally flat bands and are attached to a top surface of the body sides 12 for adjoining the upper portion of the body sides 12 to add stability and support for an overhead roof line of a vehicle. Since, the secondary cross members 30, 32, and 34 provide support for lighter loads than the underbody 14, the secondary cross members 30, 32, 34 may be made with a lightweight material such as magnesium. The joining of the secondary cross members 30, 32, 34 and the body sides 12 can be accomplished by attachment methods other than magnetic pulse welding, such as magnetic pulse forming, structural adhesives, rivets, fasteners, laser welding, MIG welding, or MIG welding or spot welding.

Figure 2:
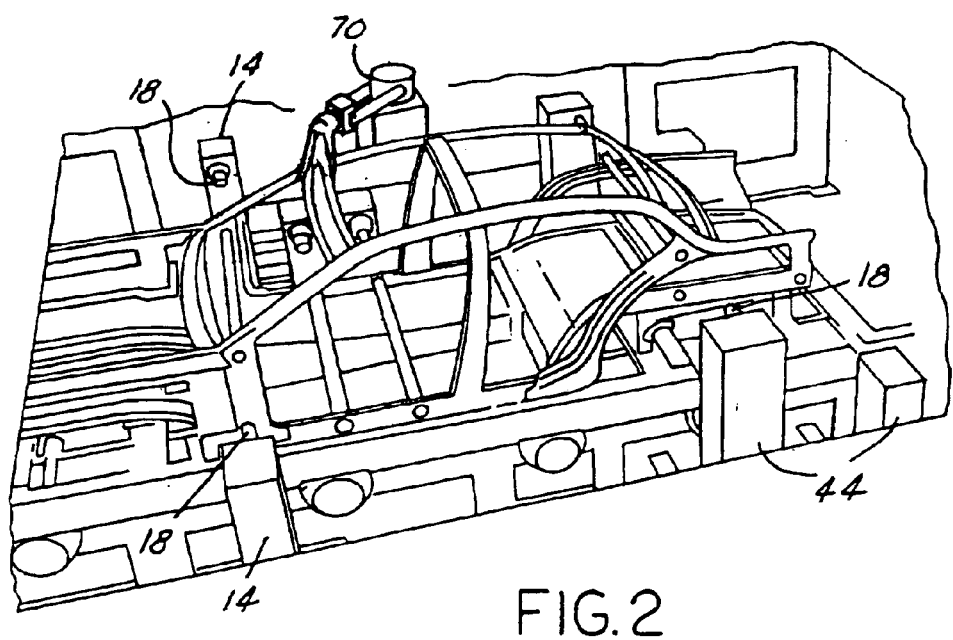
FIG. 2 is a perspective view of structural members being assembled at a magnetic pulse welding station.

FIG. 2 shows a vehicle frame assembly showing a welding process for adjoining the plurality of structural members. The vehicle frame assembly is made by interconnecting the respective end of a first structural member with the respective aperture of a second structural member to form a joint. The joint is permanently secured using an internal magnetic pulse welding process. Magnetic pulse welding is generally known in the art and includes an inductive coil 18 that is carried at an end of a moveable support 44. The inductive coil 18 comprises a winding of an electrical conductor having conductive leads (not shown) connected to a power source (not shown). When the inductive coil is energized by the power source, current flows through the inductive coil 18 creating a high intensity electromagnetic field around the inductive coil 18. The high intense electromagnetic field generates eddy currents in the material surrounding the inductive coil. The material having the eddy currents induced in it should be the higher conductive material of the two materials being bonded. The higher the conductivity properties of the material, the better suited the material is for magnetic pulse welding. The strong current generated by the inductive coil 18 and the eddy currents induced on the material surrounding the inductive coil create very strong opposing magnetic fields. As a result, the strong opposing magnetic fields repel one another, but because the currents in the inductive coil 18 are stronger than that in the surrounding material, the surrounding material is forced away from the inductive coil 18 at a very high velocity toward the second material and that the surrounding material is thereby infused into the surrounding material.

The underbody cross members 36, 38, 40, and 42 and secondary cross members 28 and 29 have an inner diameter that is slightly larger than an outer diameter of the inductive coil 18 to allow for the insertion of the inductive coil 18 at each respective joint. Moveable support 44 is shifted toward a respective joint as shown in FIG. 3. When joining cross member 42, for example, the inductive coil 18 is inserted within the inner diameter of end 42a. The inductive coil 18 is then energized by the power source. Each inductive coil may be energized at substantially the same time so as to magnetically pulse weld the underbody 14 to the body sides 12 simultaneously in one manufacturing operation. As described earlier, the presence of the electromagnetic field causes the end 42a of cross member 42 to expand radially outward at a high velocity. The expanding end 42a is thrust against the inner diameter of the aperture 42c at a high velocity and causes portions of the end 42a engaged with the portions of aperture 42c to weld or molecularly bond together. The result is a very high strength weld.

FIG. 4a shows the inductive coil 44 inserted within the end 42a. Prior to magnetic pulse welding, an annular gap 50 is present between the inner diameter of aperture 42c and the outer diameter of the end 42a. Annular gap 50 is initially formed between the outer diameter portion of end 42a and the inner diameter portion aperture of 42c to provide a sufficient amount of distance to allow the electromagnetic field to accelerate the end 42a to a high velocity toward the inner diameter of the aperture 42c during application of a pulse. After the inductive coil 18 is energized and the end 42a is radially thrust against the inner diameter wall of 42c, the annular gap 50 presently occupying the space between end 42a and aperture 42c is closed and the impact of end 42a with wall 42c results in the joinder of the two dissimilar metallic materials thereby forming a high strength weld or molecular bond as shown in FIG. 4b.

Figure 5:
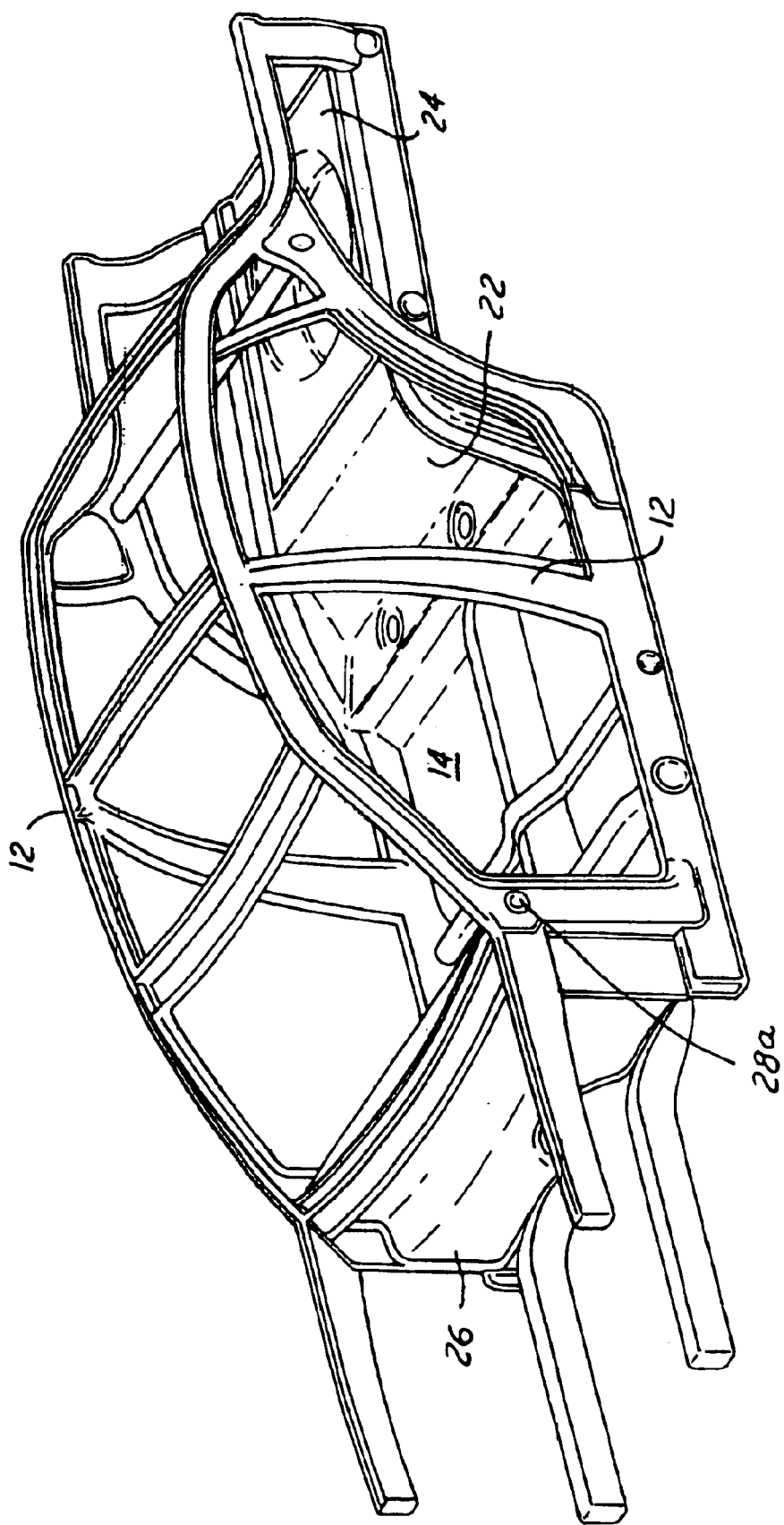
FIG. 5 is a perspective view of a vehicle framing assembly illustrating the various structural members joined by magnetic pulse welding.

FIG. 5 illustrates a finished vehicle framing assembly using an aluminum multi-planar surface underbody 14 permanently attached to the steel body sides 12 by magnetic pulse welding. As discussed earlier, various structural members of the vehicle frame assembly can be formed or joined with different metallic material. Some of the structural members may be formed from a first metallic material while an adjoining structural member may be formed from a second metallic material. For is example, the cross members 36, 38, 40, and 42 are formed from aluminum, while the remainder of the connecting structural members such as the underbody 14 and the body sides may be formed from lightweight material such as magnesium or aluminum or may be formed from a heavier material such as steel for added reinforcement. Molecular bonding of the vehicle framing assembly using magnetic pulse welding is advantageous not only because of weight reduction but also because the dissimilar materials have been found not to cause corrosion. Because the weld is formed air tight, no electrolytes are present within the weld to commence a galvanic reaction. Any exposure on the exterior surface can always be treated with a corrosion inhibitor. Alternative materials such as magnesium may be used in place of the above described materials to further increase weight efficiency. Furthermore, steel may be welded to steel to supplement the above identified process. Aluminum to aluminum, magnesium to magnesium, or the joinder of many similar or dissimilar metallic materials may be used.

Figure 6:
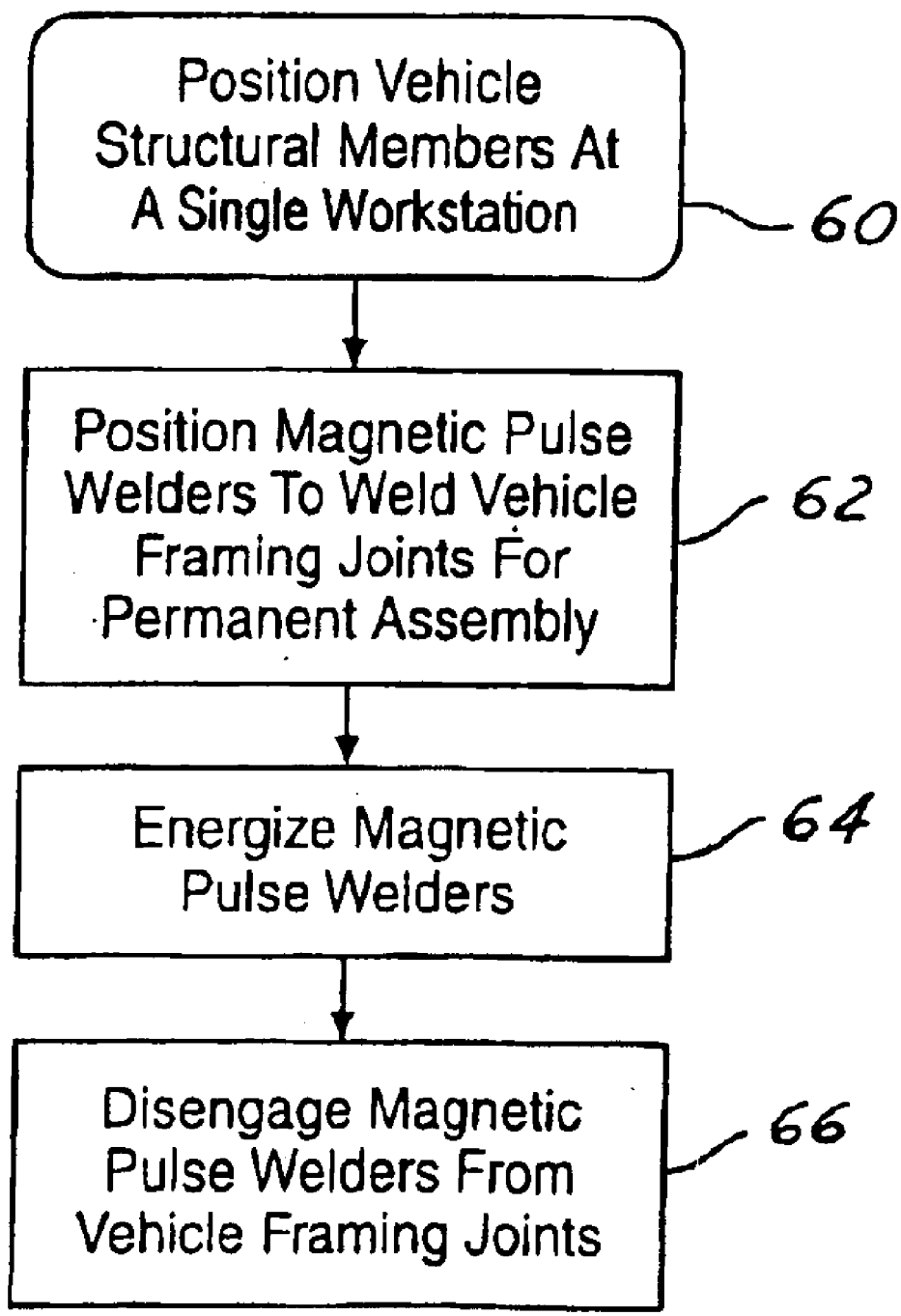
FIG. 6 is a flow diagram showing a preferred process of simultaneously magnetic pulse welding a vehicle frame assembly.

FIG. 6 illustrates a flow diagram utilizing a simultaneous magnetic pulse welding process. In step 60, various structural members of a vehicle framing assembly are juxtapositioned at a first workstation according to their desired final configurations. The structural members include an aluminum underbody having a main floor portion, a mid floor portion, a trunk floor portion, and one or more cross members. Cross members are integrally formed into the underbody by either welding or by an adhesive. The cross members are preferably made of aluminum. Alternatively, the underbody and the cross members may be formed from metallic materials other than aluminum. In addition, the underbody and the cross members may be formed from dissimilar metallic materials. Other structural members include a left and right body side and a plurality of individual loose cross members. In the preferred embodiment, the cross members integrated into the underbody are tubular in shape. Also, unitary cross members that are magnetically pulse welded are tubular in shape. However, in alternative embodiments other shapes such as square, rectangular, and U-channel, J-channel and other shapes may be utilized. The ends of the tubular cross members integrated within the aluminum underbody and the individual tubular cross members are inserted into apertures located in the left and right body sides. The apertures are through-holes and are substantially the same shape as the structural member to which it mounts. The apertures have an inner diameter (or perimeter dependent on the shape) that is slightly larger than the outer diameter of the ends. Other attachment methods such as exterior mounts (i.e., C-channel, flat brackets, U-channels) may be utilized as opposed to interior tubular mounts.

In the preferred embodiment, the underbody is first brought into position at the first workstation along a conveyor. The fixture supporting the underbody on the conveyor is a sled-type fixture. Alternatively, any type of fixture that can support the underbody along the conveyor may be used. Second, unitary cross members are then brought into position by robots (as shown in FIG. 2 reference 70) for attachment to each of the body sides. The unitary cross members are positioned at the appropriate height and orientation so as to align with the corresponding apertures in the body sides. Lastly, the body sides are brought into proper alignment and position by robots with the integral cross members of the underbody and the unitary cross members.

After the structural members are positioned, various magnetic pulse welders located about the perimeter of the framing structure are moved into position inside of the ends of the tubular cross members in step 62. The electromagnetic inductors attached to each magnetic pulse welder are circular and extend within the inner diameter of the end of the tubular cross member. If other shapes are utilized for the tubular cross members, the magnetic pulse welder will utilize the same shape as the tubular cross members. In step 64, the magnetic pulse welders are energized simultaneously to create an electromagnetic field within each joint of each tubular cross member. The electromagnetic field is directed at the inner diameter of the tubular cross member at a high velocity so as to displace the end of the tubular cross member outwardly against the inner diameter wall of the aperture. The displacement is performed at such a high velocity that a resulting permanent high strength weld or molecular bond is created at each joint. Any cross members not utilizing the magnetic pulse weld process may also be permanently attached at the same workstation using other attachment methods such as magnetic pulse forming, structural adhesives, rivets, fasteners, laser welding, MIG welding, MIG brazing, or spot welding.

In the preferred embodiment, the robots temporarily fix the position of the structural members until the final welding process is preformed. Toy tabbing, jigs, fixturing, and respotting may also be used to temporarily fix the structural members in position until the magnetic pulse welding is completed. Alternatively, the temporary fixing of the structural members and the underbody may take place at a first workstation. The temporarily fixed frame may then be transported to a second workstation where the magnetic pulse welding process is performed.

In a second preferred embodiment, a method of temporarily fixing the structural members may be used as described in pending U.S. application Ser. No. 10/407,804. The structural members to be joined are brought into alignment with a robot, wherein the one or both structural members are free to move relative to one another. After the structural members are aligned and the inductive coil of the magnetic pulse welder is inserted into the tubular cross member, the inductive coil is partially energized so as to generate an electromagnetic field within the tubular cross member. The electromagnetic field generated is of a predetermined magnitude that concentrically positions the tubular cross members within the apertures. When the tubular cross member and the apertures are concentrically positioned, the electromagnetic pulse welders apply the high magnitude electromagnetic field to permanently weld the structural members and the underbody.

In step 66, the magnetic pulse welders are disengaged and removed from each joint of the vehicle framing structure whereby a single vehicle frame assembly is produced at a single workstation utilizing a simultaneous weld operation.

From the foregoing description, one ordinarily skilled in the art can easily ascertain the essential characteristics of this invention and, without departing from the spirit and scope thereof, can make various changes and modifications to the invention to adapt it to various usages and conditions. For example, a second workstation may be utilized to make any secondary welding of the structural metallic members. Various combination of dissimilar metals may be joined using magnetic pulse welding.

What is claimed is:

1. A method of framing structural members to an underbody of an automotive vehicle, the method comprising the steps of:

providing an underbody structural member including one or more cross members at a work station;

providing a plurality of metallic structural members at said workstation;

aligning said underbody structural member to said plurality of metallic structural members at said workstation by fitting said metallic structural members to said underbody structural member using a robot; and permanently securing said assembled underbody structural member and said plurality of metallic structural members simultaneously at said workstation using magnetic pulse welding, said robot maintaining said fitting during said step of magnetic pulse welding.

2. The method of claim 1 wherein said underbody structural member includes a generally planar surface.

3. The method of claim 2 wherein said underbody structural member includes a multi-planar surface.

4. The method of claim 3 wherein said multi-planar surface includes a main floor portion, a mid floor portion, a trunk floor portion, and a bulkhead portion.

5. The method of claim 1 wherein said aligning step is comprised of inserting said ends into said respective apertures.

6. The method of claim 1 further comprising the step of spot welding to maintain said fitting during said step of magnetic pulse welding.

7. The method of claim 1 further comprising the step of toy tabbing to maintain said fitting during said step of magnetic pulse welding.

8. The method of claim 1 wherein said underbody structural member is formed from aluminum.

9. The method of claim 1 wherein said metallic structural members are dissimilar metallic structural members.

10. The method of claim 1 wherein said metallic structural members are formed from steel.

11. The method of claim 1 wherein said metallic structural members are formed from magnesium.

12. The method of claim 1 wherein said metallic structural members are formed from steel and magnesium.

13. The method of claim 1 wherein said magnetic pulse welding comprises an internal magnetic pulse welding process.

14. The method of claim 1 wherein at least one of said metallic structural members are joined by a process selected from the group comprising magnetic pulse forming, structural adhesives, rivets, fasteners, laser welding, MIG welding, MIG brazing, and spot welding.

15. The method of claim 1 wherein a respot weld is performed prior to said magnetic pulse welding.

16. A method of framing structural members to an underbody of an automotive vehicle, the method comprising the steps of:

providing an underbody structural member including one or more cross members at a work station;

providing a plurality of metallic structural members at said workstation;

temporarily fixing said underbody structural member with respect to said plurality of metallic structural members to form a frame at a first workstation by fitting said metallic structural members to said underbody structural member using a robot;

transporting said temporarily fixed frame to a secured workstation; and permanently securing said assembled underbody structural member and said plurality of metallic structural members simultaneously at a second workstation using magnetic pulse welding, said robot maintaining said fitting during said step of magnetic pulse welding.

17. The method of claim 16 wherein said step of temporarily fixing said frame is selected from the group comprising respotting, toy tabbing, jigs, robots, and fixtures.

* * * * *